United States Patent Office 3,308,207
Patented Mar. 7, 1967

3,308,207
POLYFLUORINATED PHOSPHATE ESTERS
Christian A. Seil, Santa Monica, Robert H. Boschan, Los Angeles, and James P. Holder, Woodland Hills, Calif., assignors to Douglas Aircraft Company, Inc., Santa Monica, Calif., a corporation of Delaware
No Drawing. Filed May 4, 1964, Ser. No. 364,763
21 Claims. (Cl. 260—953)

This invention relates to certain polyfluoroalkyl phosphate esters and is particularly concerned with the provision of novel polyfluoroalkyl diaryl phosphates.

It is an object of the present invention to provide a series of compounds having high fire resistance, high temperature stability, and which remain in liquid form over a wide temperature range and are relatively non-volatile at elevated temperatures.

Another object of the invention is the provision of polyfluorinated phosphate esters having the above-noted properties and other advantages, and having particular utility as hydraulic fluids, heat transfer fluids, and as lubricants.

Other objects and advantages will appear hereinafter.

We have discovered that the above-noted objects are achieved according to the invention by the provision of a class of polyfluoroalkyl diaryl phosphates having the formula (I) 

where R is a polyfluorinated alkyl group which can be either a straight chain or branched chain alkyl, preferably the former, containing from 2 to 12 carbon atoms, the number one carbon atom of said alkyl group connected to the oxygen atom of the phosphate being free of fluorine substituents, and at least one of the carbon atoms of the alkyl group commencing with the carbon atom in 2-position to the carbon atom connected to said oxygen atom is not fully fluorinated, and said last-mentioned carbon atom in 1-position is connected to only one carbon atom; and R' is aryl, e.g., phenyl, naphthyl, phenanthryl, and including substituted aryl such as tolyl, xylyl, biphenylyl, chlorophenyl, methyl naphthyl, and the like. Preferably R' is phenyl.

The preferred polyfluoroalkyl diaryl phosphate esters of the invention have the formula (II) 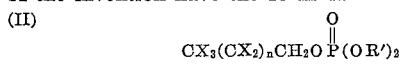

where X is a member selected from the group consisting of hydrogen, fluorine, and hydroxyl, R' is aryl as defined above, preferably phenyl, and $n$ is an integer of from 0 to 10, there being at least 2 fluorine atoms in the alkyl group, and in which at least one of the X substituents on at least one of the carbon atoms commencing with the carbon atom in the 2-position is hydrogen. Preferably, where $n$ is at least 2, the compound contains at least one fluorine atom on each of the carbon atoms of the alkyl group, commencing with the carbon atom in 4-position from the attached oxygen atom. Also, one or more, preferably one, of the X substituents present on one or more of the carbon atoms commencing with the carbon atom in 2-position, can be hydroxyl. Preferably, the major portion of the X substituents is fluorine.

In the compounds noted above, the two aryl groups R' of the polyfluoroalkyl diaryl phosphate esters hereof can be the same or different.

The most desirable class of compounds according to the invention is those which have the formula (III) 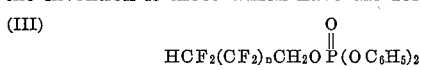

where $n$ has the values noted above.

In preferred practice, the value $n$ noted above ranges from about 2 to about 6, and in certain preferred phosphates is from 3 to 4. Also, preferably the compounds defined in the formulae noted above contain at least one fluorine atom on each of the carbon atoms, beginning with the carbon atom in the 3-position of the alkyl group from its attachment to the adjacent oxygen atom. Usually, the carbon atoms of the alkyl group beginning with the carbon atom in the 3-position and progressing to the carbon atom in the penultimate position of the alkyl group are fully fluorinated, that is, each such carbon atom has two fluorine atoms attached thereto. The last carbon atom of the alkyl group can be partially or fully fluorinated, e.g., it may have from 1 to 3 fluorine substituents thereon, preferably at least 2 fluorine atoms. When the last carbon atom of the alkyl group is fully fluorinated, at least one of the other carbon atoms of the alkyl group commencing with the carbon atom in 2-position, and preferably the latter carbon atom, is not fully fluorinated. The carbon atom in the 1-position attached to the oxygen atom is free of fluorine atoms.

By using a polyhydric, e.g., a dihydric, polyfluorinated alcohol in the esterification reaction described hereinafter for producing the phosphate esters of the invention, one or more free hydroxyl groups will be present on the carbon atoms of the alkyl group commencing with the carbon atom in 2-position. In the most desirable class of compounds represented by Formula III above, the presence of only fluorine atoms on the carbon atom in 2-position (the beta carbon atom) renders these compounds particularly thermally resistant. The combined fluorine content of the polyfluorinated phosphate esters of the invention can range from about 10% to about 55%, preferably about 25% to about 50%, by weight.

It has been found that the above-defined polyfluoroalkyl diaryl, preferably diphenyl, phosphates are particularly valuable as functional fluids, e.g., as base stocks for hydraulic fluids, and are also useful as heat transfer media and as lubricants due to the advantageous physical properties of such compounds. These properties include high fire resistance, increased temperature stability, and liquidity over a relatively wide temperature range. Thus, for example, generally, these fluorinated phosphate esters have a thermal stability in the range of about 400 to about 700° F., auto-ignition temperatures up to and in excess of 1000° F., and remain liquid down to a temperature of the order of —20 to —65° F. Further, the viscosity of such fluoroalkyl diaryl phosphate esters at low temperatures of the order of —20 to —65° F. permits the operative use of such liquids as hydraulic fluids, cooling media and lubricants in these low temperature ranges. These compounds are also relatively non-volatile at elevated temperatures due to the high boiling point of these materials. Also, the phosphate esters of the invention have relatively low pour points, e.g., in the range of about —20° F. to about —75° F., or lower, which, together with the relatively low viscosity of these materials at low temperatures, permits the liquid compounds to be pumped without high expenditure of energy at low temperatures. Moreover, the phosphate esters of the invention have good hydrolytic stability and do not adversely affect materials, such as metals, e.g., steel, copper, and the like, with which they may be in contact. These improved properties are believed to be due to the presence of the combination of the class of polyfluoroalkyl radicals noted above and the two aryl radicals in the phosphate esters of the invention.

The above-noted properties render the phosphate esters hereof particularly useful as hydraulic fluids, lubricants and cooling fluids in aircraft systems, especially modern high-speed aircraft systems.

The polyfluorinated alkyl phenyl phosphate esters of the invention are produced by reacting the corresponding polyfluorinated alcohol with a diaryl phosphoryl chloride, preferably diphenyl phosphoryl chloride in a proportion of about one mole of the alcohol to one mole of the phosphoryl chloride, preferably in the presence of pyridine or any other suitable HCl acceptor. The proportion of HCl acceptor or pyridine generally employed is usually about equimolar with respect to the polyfluorinated alcohol. The mixture is then heated at reflux for a period of hours, e.g., about 6 to 12 hours, and is then cooled and a relatively large volume of water added. In certain instances when employing particularly reactive alcohols such as the polyhydric polyfluorinated alcohols, heating of the reaction mixture is not necessary. The mixture separates into a lower organic phase and an aqueous phase, and the organic phase containing the polyfluorinated phosphate ester is withdrawn. The aqueous layer is extracted with a solvent such as ether to remove organic values and the ether extract is added to the main organic layer withdrawn. The remaining organic reaction mixture is then treated with neutralizing agents, washed with water, and then dried with a drying agent such as anhydrous magnesium sulfate. Unreacted polyfluorinated alcohol and solvents are removed by distilling at low pressure, and the remaining mixture is distilled at reduced pressure, to recover the desired polyfluoroalkyl diaryl, preferably diphenyl, phosphate compounds.

Specific examples of polyfluoralkyl diphenyl phosphates of the invention as follows:

(1) $HCF_2CH_2O\overset{O}{\overset{\|}{P}}(OC_6H_5)_2$ (1a) $HCF_2CF_2CH_2O\overset{O}{\overset{\|}{P}}(OC_6H_5)_2$ (2) $HCF_2CF_2CF_2CH_2O\overset{O}{\overset{\|}{P}}(OC_6H_5)_2$ (3) $H_2CFCF_2CF_2CH_2O\overset{O}{\overset{\|}{P}}(OC_6H_5)_2$ (4) $HCF_2CF_2CF_2CH_2O\overset{O}{\overset{\|}{P}}(OC_6H_5)_2$ (5) $CF_3CF_2CF_2CH_2CH_2O\overset{O}{\overset{\|}{P}}(OC_6H_5)_2$ (6) $HCF_2CF_2CF_2CF_2CH_2O\overset{O}{\overset{\|}{P}}(OC_6H_5)_2$ (7) $CF_3CF_2CF_2\overset{OH}{\overset{|}{C}}HCH_2CH_2O\overset{O}{\overset{\|}{P}}(OC_6H_5)_2$ (7a) $CF_3CF_2CF_2CH_2CH_2CH_2O\overset{O}{\overset{\|}{P}}(OC_6H_5)_2$ (8) $CF_3(CF_2)_3CHFCH_2O\overset{O}{\overset{\|}{P}}(OC_6H_5)_2$ (9) $HCF_2(CF_2)_5CH_2O\overset{O}{\overset{\|}{P}}(OC_6H_5)_2$

(10) $CF_3(CF_2)_5CHFCH_2O\overset{O}{\overset{\|}{P}}(OC_6H_5)_2$

(11) $HCF_2(CF_2)_7CH_2O\overset{O}{\overset{\|}{P}}(OC_6H_5)_2$

(12) $HCF_2(CF_2)_7CH_2CH_2O\overset{O}{\overset{\|}{P}}(OC_6H_5)_2$

(13) $HCF_2(CF_2)_9CH_2O\overset{O}{\overset{\|}{P}}(OC_6H_5)_2$

(14) $HCF_2(CF_2)_9CH_2CH_2O\overset{O}{\overset{\|}{P}}(OC_6H_5)_2$

(15) $CF_3CF_2CF_2CH_2CH_2O\overset{O}{\overset{\|}{P}}(OC_{10}C_6H_7)_2$

(16) $HCF_2CF_2CF_2CF_2CH_2O\overset{O}{\overset{\|}{P}}(OC_6H_4-CH_3)_2$

(17) $CF_3CF_2CF_2CH_2CH_2O\overset{O}{\overset{\|}{P}}(O-C_6H_4-C_6H_5)_2$

(18) $CF_3CF_2\overset{OH}{\overset{|}{C}}HCH_2CH_2CH_2O\overset{O}{\overset{\|}{P}}(OC_6H_5)_2$ Preferred compounds of the invention are compounds (5), (6) and (7) above, these compounds being, respectively, 3,3,4,4,5,5,5-heptafluoropentyl diphenyl phosphate, 1,1,5-trihydroperfluoropentyl diphenyl phosphate, and 3-hydroxy 4,4,5,5,6,6,6-heptafluorohexyl diphenyl phosphate.

As noted above, the polyfluoroalkyl diaryl phosphates hereof are produced from the corresponding polyfluorinated alcohols. A useful starting material for producing another polyfluoroalkyl diphenyl phosphate product according to the invention is the telomer fluoroalcohol mixture containing substantial amounts of each of the odd number polyfluoro telomer alcohols from the $C_3$ to the $C_{11}$ alcohols. These alcohols have the general formula $H(CF_2-CF_2)_{n_1}CH_2OH$, where $n_1$ is an integer of from 1 to 5.

The $C_3$ alcohols of this mixture contain about 37% by weight fluorine and the $C_{11}$ alcohols of the mixture about 63% by weight of fluorine. The use of such telomer alcohol mixture is economical, since the cost of such mixture is substantially less than the cost of the individual pure polyfluorinated alcohols, and the resulting phosphate product is highly suitable as a hydraulic fluid, heat transfer medium, and lubricant.

The respective phosphate ester compounds in the mixture of phosphate esters produced employing the above-noted fluoroalcohols telomer mixture have the following formula:

(IV) $R''O\overset{O}{\overset{\|}{P}}(OC_6H_5)_2$ where $R''$ is $H(CF_2CF_2)_{n_1}CH_2-$, where $n_1$ has the values defined above.

The following are examples of preparation of the compounds of the invention.

Example 1.—1,1,5-trihydroperfluoropentyl diphenyl phosphate

To 116 g. (0.50 mole) of 1,1,5-trihydroperfluoropentanol, 43.4 g. (0.55 mole) of pyridine, and 140 ml. of benzene were added dropwise with stirring 134 g. (0.50 mole) of diphenyl phosphoryl chloride. The temperature was maintained at 17° to 25° C. during the addition, which was complete in 25 minutes. The mixture was then heated to reflux temperature and refluxed overnight. The mixture was then cooled and poured into one liter of water. The organic layer was withdrawn and the aqueous layer was extracted with two 200 ml. portions of ether; the ether extracts were then added to the organic layer, which was then washed with successive 100 ml. portions of 5% hydrochloric acid, 5% sodium bicarbonate and water. After drying over anhydrous magnesium sulfate, the solvents were removed by lowering the pressure with a water aspirator while heating.

The residue was distilled at lower pressure. The main phosphate ester fraction, 167.9 g. (72.4% yield), distilled at 145°–146.5° C. (0.090–0.095 mm. mercury), density at 77° F.–1.45 g./ml.

The resulting polyfluoroalkyl diphenyl phosphate, compound (6) above, has satisfactory viscosity at low temperatures, low pour point, good thermal stability, high autoignition temperature, good hydrolytic stability, and high fire resistance. Such phosphate is particularly useful as a base stock for a hydraulic fluid of an aircraft system.

*Example 2.—3,3,4,4,5,5,5-heptafluoropentyl diphenyl phosphate*

The procedure of Example 1 is substantially carried out except employing in place of the fluoroalcohol of Example 1, an equivalent molar amount of 3,3,4,4,5,5,5-heptafluoropentanol.

The resulting polyfluoroalkyl diphenyl phosphate compound (5) above, has properties similar to the phosphate produced in Example 1, and can be employed as a hydraulic fluid and lubricant in an aircraft system.

*Example 3.—3-hydroxy-4,4,5,5,6,6,6-heptafluorohexyl diphenyl phosphate*

To a mixture of 40.3 g. (0.165 mole) of 4,4,5,5,6,6,6-heptafluoro-1,3-hexanediol and 52.2 g. (0.194 mole) of diphenyl phosphoryl chloride was added, slowly with stirring, 250 cc. of redistilled 2,6-lutidine, and the mixture was stirred overnight.

The mixture was poured onto cracked ice and rinsed with successive 50 ml. portions of 2,6-lutidine and water. The bottom ester layer was drawn off and washed with two 150 ml. portions of water. The aqueous layer was washed with ether and these washings were added to the main ester layer. After drying over magnesium sulfate, the ether was distilled and the lutidine was removed by distillation at 3 mm. mercury. The residue was distilled at lower pressure. The main ester fraction, 40.6 g. (53.5% yield) distilled at 159°–162° C. (.033–.035 mm. mercury). Redistillation of this material yielded a product distilling at 158°–162° C. (.030–.032 mm.).

*Analysis.*—Calculated for $C_{18}H_{16}F_7PO_5$: C, 45.39; H, 3.39; P, 6.50. Found: C, 45.23; H, 3.88; P, 6.80.

The resulting polyfluoroalkyl diphenyl phosphate compound (7) above, has satisfactory viscosity at low temperatures, low pour point, good thermal stability, high auto-ignition temperature, good hydrolytic stability, and high fire resistance. Such phosphate can be used as a hydraulic fluid or a lubricant in an aircraft system.

*Example 4.—Mixed telomer polyfluoroalcohol diphenyl phosphate*

The procedure of Example 1 is substantially carried out except employing in place of the fluoroalcohol of Example 1, an equivalent molar amount of the mixed telomer fluoroalcohols containing the $C_3$, $C_5$, $C_7$, $C_9$ and $C_{11}$ polyfluoroalcohols, as noted above.

The resulting polyfluoroalkyl diphenyl phosphate ester mixture containing compounds having the general Formula IV above, including compounds (2), (6), (9), (11) and (13) above, has satisfactory viscosity at low temperatures, low pour point, good thermal stability, high auto-ignition temperature, good hydrolytic stability, and high fire resistance.

*Example 5*

Compounds (1), (3), (4), (7a), (8), (10), (12) and (14) to (18) are prepared by procedure similar to that described above in Example 1, except employing in each instance the appropriate corresponding fluorinated alcohol.

The resulting polyfluoroalkyl diaryl phosphate esters thus obtained have properties generally similar to those of compound (6) above, as recited in Example 1.

Applicants are aware of U.S. Patent 2,754,316, assigned to the same assignee as the instant application. This patent describes diaryl mono-fluoroalkyl phosphates in which all of the carbon atoms of the alkyl chains commencing with the carbon atom in 2-position from the oxygen of the phosphate radical, are fully fluorinated, that is, comprise $CF_2$ and $CF_3$ groups, as contrasted to the polyfluoroalkyl diaryl phosphate esters of the present invention defined above and wherein at least one of the carbon atoms of the alkyl groups or chains commencing with the carbon atom in such 2-position is not fully fluorinated, and wherein said at least one carbon atom can be unfluorinated, as for example, the carbon atom in 2-position in the alkyl groups of compounds (5), (7), (7a), (12), (14), (15), (17) and (18) above. Although the phosphates described in the above patent are valuable for use as hydraulic fluids, heat transfer media and the like, the compounds of the instant invention are at least equally valuable in this respect and also have certain advantages over the different compounds of the above patent. Thus, for example, the fluorinated alcohols used in preparing many of the phosphates of the instant invention are more readily available and considerably less expensive than the fluorinated alcohols required to prepare many of the phosphates of the patent, and hence such fluorophosphates of the invention are considerably less expensive than such fluorinated phosphates of the patent.

From the foregoing it is seen that the invention provides a novel class of polyfluoroalkyl diaryl phosphates which are designed particularly for use as base stocks of hydraulic fluids in aircraft systems, and which are also useful as lubricants and as heat transfer or cooling media in aircraft systems.

While we have described particular embodiments of our invention for the purpose of illustration, it should be understood that various modifications and adaptations thereof may be made within the spirit of the invention, as set forth in the appended claims.

We claim:
1. A phosphate having the formula

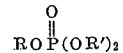

where R is a polyfluorinated alkyl group containing from 2 to 12 carbon atoms, the number one carbon atom of said alkyl group connected to the oxygen atom of the phosphate being free of fluorine substituents, and at least one of the carbon atoms of the alkyl group commencing with the carbon atom in 2-position to the carbon atom connected to said oxygen atom is not fully fluorinated, and said last mentioned carbon atom in 1-position is connected to only one carbon atom; and R′ is aryl.

2. A compound as defined in claim 1, wherein R′ is phenyl.

3. A polyfluoroalkyl diaryl phosphate having the formula

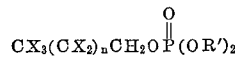

where X is a member selected from the group consisting of hydrogen, fluorine and hydroxyl, R′ is aryl, and n is an integer of from 0 to 10, there being at least 2 fluorine atoms in the alkyl group, and in which at least one of the X substituents on at least one of the carbon atoms commencing with the carbon atom in the 2-position is hydrogen.

4. A compound as defined in claim 3, wherein when n is at least 2, said compound contains at least one fluorine atom on each of the carbon atoms of the alkyl group commencing with the carbon atom in 4-position from the attached oxygen atom.

5. A polyfluoroalkyl diphenyl phosphate having the formula

where X is a member selected from the group consisting of hydrogen, fluorine and hydroxyl, and n is an integer of from 0 to 10, there being at least 2 fluorine atoms in the alkyl group, and in which at least one of the X substituents on at least one of the carbon atoms commencing with the carbon atom in the 2-position is hydrogen.

6. A compound as defined in claim 5, wherein n is an integer of from 2 to 6.

7. A compound as defined in claim 5, wherein $n$ is an integer of 3 to 4.

8. A compound as defined in claim 5, wherein said phosphate contains from about 10% to about 55% by weight of combined fluorine.

9. A compound as defined in claim 5, wherein the major portion of said X substituents are fluorine.

10. A compound as defined in claim 5, wherein $n$ is an integer of from 2 to 6, and wherein the major portion of said X substituents are fluorine, said phosphate containing from about 25% to about 50% by weight of combined fluorine.

11. A compound as defined in claim 3, wherein $n$ is an integer of from 2 to 6.

12. A bis(polyfluoroalkyl)phenyl phosphate having the formula

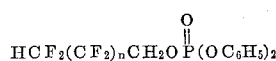

where $n$ is an integer of from 0 to 10.

13. A compound as defined in claim 12, wherein $n$ is an integer of from 2 to 6.

14. A mixture of compounds having the formula

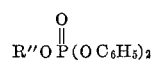

where R″ is

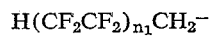

where $n_1$ is an integer of from 1 to 5.

15. A mixture of compounds as defined in claim 14, where R″ includes $C_3$, $C_5$, $C_7$, $C_9$ and $C_{11}$ alkyl chains.

16. The compound having the formula

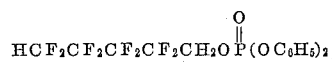

17. The compound having the formula

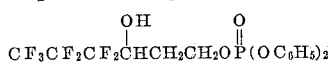

18. The compound having the formula

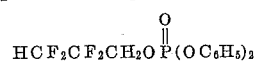

19. The compound having the formula

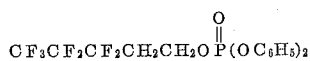

20. A polyfluoroalkyl diphenyl phosphate having the formula

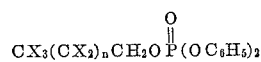

where X is a member selected from the group consisting of hydrogen, fluorine and hydroxyl, and $n$ is an integer of from 0 to 10, there being at least 2 fluorine atoms in the alkyl group, and in which at least one of the X substituents on at least one of the carbon atoms in the 2, 3 and terminal positions is hydrogen.

21. A compound as defined in claim 20, wherein $n$ is an integer of from 2 to 6.

References Cited by the Examiner
UNITED STATES PATENTS

| | | | |
|---|---|---|---|
| 2,597,702 | 5/1952 | Benning | 260—461 |
| 2,656,373 | 10/1953 | Gamrath | 260—461 |
| 2,727,058 | 12/1955 | Conly | 260—461 |
| 2,754,316 | 7/1956 | Conly | 260—461 |
| 2,885,377 | 5/1959 | Knowles et al. | 260—461 X |
| 2,955,985 | 10/1960 | Kuna | 260—461 X |

CHARLES B. PARKER, *Primary Examiner.*

FRANK M. SIKORA, *Assistant Examiner.*